United States Patent
Hahn (10) Patent No.: US 12,280,723 B2
(45) Date of Patent: Apr. 22, 2025

(54) COVERING ASSEMBLY FOR A SIDE SILL OF A PASSENGER MOTOR CAR

(71) Applicant: Mercedes-Benz Group AG, Stuttgart (DE)

(72) Inventor: Samuel Hahn, Aidlingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 330 days.

(21) Appl. No.: 18/002,200

(22) PCT Filed: May 18, 2021

(86) PCT No.: PCT/EP2021/063072
§ 371 (c)(1),
(2) Date: Dec. 16, 2022

(87) PCT Pub. No.: WO2021/259556
PCT Pub. Date: Dec. 30, 2021

(65) Prior Publication Data
US 2023/0339414 A1    Oct. 26, 2023

(30) Foreign Application Priority Data

Jun. 25, 2020   (DE) .................... 10 2020 003 821.2

(51) Int. Cl.
*B62D 25/02* (2006.01)
*B60R 13/04* (2006.01)

(52) U.S. Cl.
CPC ............ *B60R 13/04* (2013.01); *B62D 25/025* (2013.01)

(58) Field of Classification Search
CPC ............... B62D 25/025; B60R 13/04
(Continued)

(56) References Cited

U.S. PATENT DOCUMENTS 8,602,467 B2 * 12/2013 Lee ................... B60R 11/06
                                                      293/106
8,939,456 B2 *  1/2015 Shelswell ........... B60R 3/002
                                                      280/166
(Continued)

FOREIGN PATENT DOCUMENTS

DE       36 13 301 A1   10/1987
DE   10 2004 045 382 A1  3/2006
(Continued)

OTHER PUBLICATIONS

PCT/EP2021/063072, International Search Report dated Aug. 10, 2021 (Two (2) pages).
(Continued)

*Primary Examiner* — Gregory A Blankenship
(74) *Attorney, Agent, or Firm* — Crowell & Moring LLP (57) ABSTRACT

A covering assembly for a side sill of a passenger motor car includes a sill cover which has a first covering element, a second covering element, and a drive unit. Via the drive unit the first covering element is pivotable around a first pivot axis and the second covering element is pivotable relative to the side sill between a covering position and a convenience position around a second pivot axis. The drive unit is a spindle drive which has a motor shared with the covering elements, a spindle shared with the covering elements and rotatable by the motor, and a driving element shared with the covering elements and screwed onto the spindle. The driving element is slidable along the spindle via rotation of the spindle such that the covering elements are pivotable.

9 Claims, 5 Drawing Sheets

(58) Field of Classification Search
USPC .................................................. 296/209, 1.08
See application file for complete search history.

(56) References Cited

U.S. PATENT DOCUMENTS

| | | | | |
|---|---|---|---|---|
| 9,481,396 | B2* | 11/2016 | Jachowski | B62D 35/008 |
| 10,654,418 | B2* | 5/2020 | He | B60R 3/002 |
| 11,001,208 | B2* | 5/2021 | Hahn | B60R 13/04 |
| 11,312,318 | B2* | 4/2022 | Hahn | B62D 25/2072 |
| 11,325,543 | B2* | 5/2022 | Hahn | B62D 25/2072 |
| 11,634,090 | B2* | 4/2023 | Hahn | B62D 25/025 |
| | | | | 296/209 |
| 2005/0258616 | A1* | 11/2005 | Scheuring | B60R 3/02 |
| | | | | 280/166 |
| 2007/0152475 | A1* | 7/2007 | Harrison | B62D 35/008 |
| | | | | 296/209 |
| 2008/0054586 | A1* | 3/2008 | Lechkun | B60R 3/02 |
| | | | | 280/166 |
| 2022/0024527 | A1* | 1/2022 | Knauer | B60R 13/04 |
| 2023/0339414 | A1* | 10/2023 | Hahn | B60R 13/04 |
| 2024/0010283 | A1* | 1/2024 | Salkic | B60R 13/04 |

FOREIGN PATENT DOCUMENTS

| | | |
|---|---|---|
| DE | 20 2011 005 504 U1 | 12/2011 |
| DE | 10 2017 009 030 A1 | 6/2018 |
| DE | 10 2017 000 394 A1 | 7/2018 |
| DE | 10 2017 000 803 A1 | 8/2018 |
| DE | 10 2018 001 993 A1 | 9/2019 |
| DE | 10 2018 009 450 B3 | 3/2020 |
| WO | WO 2006/000010 A1 | 1/2006 |
| WO | WO 2019/174768 A1 | 9/2019 |

OTHER PUBLICATIONS

German-language German Office Action issued in German application No. 10 2020 003 821.2 dated Mar. 17, 2021 (Nine (9) pages).

* cited by examiner

COVERING ASSEMBLY FOR A SIDE SILL OF A PASSENGER MOTOR CAR

BACKGROUND AND SUMMARY OF THE INVENTION

The invention relates to a covering assembly for a side sill of a passenger motor car.

DE 10 2017 000 803 A1 discloses a covering assembly for covering a bodywork element of a vehicle. A covering assembly for a side sill of a passenger motor car with a sill cover, that comprises covering elements that are arranged under a door opening in a longitudinal area of the side sill and coupled movably with each other, can also be taken as known from WO 2019/174768 A1.

It is the object of the present invention to provide a covering assembly for a side sill of a passenger motor car, so that an especially simple and space-efficient construction of the covering assembly can be achieved.

A first aspect of the invention relates to a covering assembly for a side sill of a passenger motor car. The side sill is also referred to as a side-mounted longitudinal beam and is preferably a component of a car body of the passenger motor car that is in particular formed as a self-supporting car body. The covering assembly has a sill cover, by means of which the side sill is at least partially covered or to be covered. The sill cover has a first covering element, which is arranged under a door opening in a longitudinal area of the side sill. The door opening is here at least partially, in particular at least mostly or completely, delimited by the car body. In particular, the door opening is a door opening on the side. In its fully manufactured state of the passenger motor car, the door opening is associated with a door, in particular a side door, which is held movably, in particular pivotably, on the car body in the fully manufactured state of the passenger motor car. Here, the door can be moved, in particular pivoted, relative to the car body between a closed position and at least one open position. In the closed position, at least one section of the door opening is overlapped by the door and is thus closed. In the open position, the door opens the section, so that, for example, a person can enter and leave the interior of the passenger motor car, which is also referred to as a passenger compartment or passenger area and is delimited by the car body, via the door opening and thus via the opened section. Here, the door opening is at least partially, in particular at least mostly or completely delimited by the side sill at the bottom in the vertical direction of the vehicle, and in particular by the mentioned longitudinal area of the side sill, so that the mentioned longitudinal area extends, for example, in the longitudinal direction of the vehicle at least across a part of a length of the door opening in the longitudinal direction of the vehicle, in particular at least across half or more than half of the length or across the whole length of the door opening.

The side sill cover also has a second covering element that is arranged under the door opening in the longitudinal area of the side sill. Since the covering elements are arranged in the longitudinal area, the covering elements are at least partially, in particular at least mostly or completely in line with the door opening in the longitudinal direction of the vehicle, and are arranged underneath the door opening in the vertical direction of the vehicle.

The covering assembly also comprises a drive unit, in particular shared with the covering elements, by means of which the first covering element is pivotable around a first pivot axis and the second covering element is pivotable relative to the side sill between a covering position and a convenience position, which is also referred to as an entry position or exit position, around a second pivot axis that is spaced apart from the first pivot axis and runs parallel to the first pivot axis. Preferably, the covering elements are also pivotable relative to each other, between the covering position and the convenience position. Since the covering elements are arranged in the longitudinal area, at least the longitudinal area of the side sill is overlapped and thus covered, at least in the covering position, by means of the covering elements, in particular on the outside in the transverse direction of the vehicle and/or at the top in the vertical direction of the vehicle and/or at the bottom in the vertical direction of the vehicle. This should in particular be understood to mean that, at least in the covering position, a first part of the longitudinal area of the side sill is overlapped and thus covered by the first covering element, in particular in a first direction, and a second part of the longitudinal area is overlapped and thus covered by the second covering element, in particular in a second direction, wherein the directions can run diagonally or parallel to each other.

In order to be able to achieve an especially simple and space-efficient construction of the covering assembly, it is provided according to the invention that the drive unit is formed as a spindle drive, in particular shared with the covering elements. The spindle drive comprises a motor that is shared with the covering elements, which can in particular be formed as an electric motor. The spindle drive also comprises a spindle that is shared with the covering elements, which is drivable by means of the motor and is thereby rotatable relative to the covering elements as well as, preferably, relative to the side sill, around an axis of rotation of the spindle. Furthermore, the spindle drive comprises a driving element that is shared with the covering elements, which is screwed onto the spindle. To this end, the spindle has a first thread, which is, for example, formed as external screw threading, wherein the driving element has a second thread that, for example, corresponds to the first thread and is, for example, formed as internal screw threading. Here, the driving element is, for example, screwed onto the spindle in such a way that the threads mentioned are screwed to each other. The driving element is thus, for example, formed as a female connector. The driving element is slidable along the spindle by means of rotation of the spindle occurring relative to the driving element and preferably around the spindle axis of rotation, whereby the covering elements are pivotable between the convenience position and the covering position. In other words, the driving element is, for example, secured against rotation occurring around the spindle axis of rotation, or is restricted concerning rotation occurring around the axis of rotation, so that the spindle is then rotated relative to the driving element around the spindle axis of rotation, if the spindle is driven by means of the motor and is thereby rotated relative to the covering elements or relative to the side sill around the spindle axis of rotation. This rotation of the spindle that occurs relative to the driving element is turned relative to the spindle into a translational movement of the driving element by means of the thread, so that, for example, if the spindle is rotated relative to the driving element around the spindle axis of rotation in a first direction of rotation by means of the motor, the driving element is then slid relative to the spindle and along the spindle in a first direction of movement. Here, the first direction runs, for example, parallel to the longitudinal direction of extension of the spindle. However, if the spindle is rotated relative to the driving element around the spindle axis of rotation in a second direction of rotation that is opposite to the first direction of rotation by means of the motor, then the driving element is thereby moved relative to the spindle and along the spindle in a second direction of movement that is opposite to the first direction of movement. In this way, the driving element can be slid back and forth, or translationally moved back and forth by means of the corresponding rotation of the spindle back and forth. For example, the covering elements are pivoted out of the convenience position into the covering position because the driving element is slid in the first direction of movement. The covering elements thus, for example, slide from the covering position into the convenience position, because the driving element is slid in the second direction of movement. The spindle drive itself is especially compactly constructed, so that a space-efficient construction of the overall covering assembly can be achieved. The spindle drive also has a simple and therefore robust construction, so that a simple construction of the overall covering assembly can be presented.

An especially high comfort level, especially during getting in and out of the car, can also be achieved by means of the covering assembly according to the invention. The covering elements are, for example, at least partially, in particular at least mostly or completely pivoted or moved inwards in the transverse direction of the vehicle by means of pivoting the covering elements out of the covering position into the convenience position. It can then in particular be provided that a rim that is higher in the vertical direction of the vehicle in the covering position, or an area of the first covering element that is higher in the vertical direction of the vehicle in the covering position, is pivoted inwards in the transverse direction of the vehicle, if the first covering element is pivoted out of the covering position into the convenience position. Furthermore, it is, for example, conceivable that a rim that is lower in the vertical direction of the vehicle in the covering position, or an area of the second covering element that is lower in the vertical direction of the vehicle in the covering position and/or a rim that is on the outside in the transverse direction of the vehicle in the covering position, or an area of the second covering element that is on the outside in the transverse direction of the vehicle in the covering position is then pivoted inwards in the transverse direction of the vehicle and/or downwards in the vertical direction of the vehicle, if the second covering element is pivoted out of the covering position into the convenience position. By pivoting the covering elements out of the covering position into the convenience position, a space or an area is, for example, freed, that is surrounded by the covering elements in the covering position. By freeing up the mentioned space, a person who is getting out of the interior via the door opening can, for example, move and position at least one of their legs in such a way that at least a part of the leg is arranged in the freed-up space or passes through the freed-up space. The person can thereby get out of the interior especially easily and comfortably, in particular without the leg or trousers of the person being touched and thereby dirtied by the side sill or the covering assembly.

In advantageous embodiments of the invention, the spindle is pivotable relative to the side sill with the covering elements around an axis of rotation. This means that during the pivoting of the covering elements, the spindle is pivoted with them, and hereby rotates around the axis of rotation, in particular relative to the side sill and preferably also relative to the covering elements. A simple mounting and a space-efficient movement of the covering elements can thereby be achieved, so that the space requirements of the covering elements can be kept especially low, and their construction can be kept especially simple. In order to thereby achieve an especially simple and compact construction of the covering assembly, it has been shown to be advantageous if the axis of rotation, which preferably runs parallel to the pivot axes, is spaced apart from the pivot axes, in particular in the transverse direction of the vehicle and/or in the vertical direction of the vehicle. Preferably, the axis of rotation is arranged further inwards in the transverse direction of the vehicle than the pivot axes.

A further embodiment is characterized in that the motor is also pivotable relative to the side sill and preferably also relative to the covering elements with the covering elements and with the spindle, around the axis of rotation. An excessively complex coupling of the motor to the spindle or of the spindle to the covering elements can thereby be avoided, so that an especially simple construction can be presented.

The features of the spindle or the motor being pivotable relative to the side sill around the axis of rotation can in particular be understood to mean that the spindle or the motor is mounted at least indirectly on the side sill, to be rotatable relative to the side sill, around the axis of rotation. The axis of rotation is thereby preferably stationary relative to the side sill, so that the axis of rotation is not moved relative to the side sill during pivoting of the covering elements. Alternatively or additionally, the respective pivot axis is preferably stationary relative to the side sill, so that a relative movement between the respective pivot axis and the side sill during pivoting of the covering elements is omitted. Furthermore, the features of the covering elements being pivotable relative to the side sill around the pivot axes can be understood to mean that the respective covering element is mounted at least indirectly on the side sill, to be pivotable relative to the side sill, around its respective pivot axis. Since the spindle is preferably pivotable relative to the side sill around the axis of rotation and thus, for example, rotates or pivots relative to the side sill, around the axis of rotation during pivoting of the covering elements, the mentioned direction of movement is, for example, pivoted relative to the side sill, around the axis of rotation during pivoting of the spindle around the axis of rotation.

In order to be able to achieve the pivoting of the spindle as well as preferably also the pivoting of the motor in an especially simple and space-efficient way, it is provided in a further embodiment of the invention that the covering assembly has a guide slot, by means of which the driving element and, via this, the spindle is positively guided in the sliding of the driving element that occurs along the spindle. The pivoting of the spindle and preferably also of the motor around the axis of rotation thereby results from the sliding of the driving element that occurs along the spindle. In other words, if the driving element is slid along the spindle, the driving element then, for example, comes, by means of the positive guidance, at least indirectly, in particular via a coupler that is displaceable with the driving element, into an at least indirect, in particular a direct support attachment with a respective wall area, which, for example, directly delimits the guide slot. The guide slot or the wall area here runs, for example, in an arched shape and/or diagonally, in particular relative to the direction of movement. The sliding of the driving element along the spindle is thereby transformed into a pivoting movement of the spindle and preferably also of the motor occurring around the axis of rotation and relative to the side sill, so that a cost-efficient and thus simple as well as space-efficient pivoting of the spindle and consequently of the covering elements occurring by means of the positive guidance can be presented. Here, it is preferably provided that the guide slot is stationary relative to the side sill, so that a movement of the guide slot relative to the side sill is omitted during pivoting of the covering elements and thus the spindle.

A further embodiment provides a coupling element that is slidable with the driving element, which, for example, is the previously mentioned coupler. The coupling element is coupled, in particular flexibly, to one of the covering elements. The coupling element also passes through a corresponding coupling slot of the other covering element, that is formed as a through-opening. This means that the coupling slot is formed in the other covering element or in a wall of the covering element and passes through the other covering element or the wall, in particular completely. The coupling element is, for example, thereby coupled to one covering element, in particular flexibly, on a first side of the other covering element that faces away from the driving element, wherein the driving element is arranged on a second second side of the other covering element, that faces away from the first side and, for example, from the one covering element, and, for example, is coupled or connected to the coupling element on the second side. An especially space-efficient and simple construction can thereby be achieved.

Because the coupling element passes through the coupling slot, the other covering element is also coupled to the coupling element, so that the covering elements are coupled to the driving element via the coupling element. In particular, the other covering element is also flexibly coupled to the coupling element. By means of the coupling of the covering elements to the coupling element and, via the coupling element, to the driving element, the covering elements are pivotable via the coupling element, by means of the sliding of the driving element that occurs along the spindle by means of the driving element. The coupling of the other covering element via the coupling slot to the coupling element can, for example, be provided in such a way that, if the driving element is slid along the spindle, then the coupling element is slid into and along the coupling slot—while it passes through the coupling slot and is thus at least partially arranged in the coupling slot. Here, the coupling element comes into an at least indirect, in particular a direct, support attachment with at least one wall area of the other covering element that in particular directly delimits the coupling slot, so that then, by means of moving or sliding the coupling element, the other covering element is pivoted.

In order to be able to keep the construction of the covering element especially simple, it is provided in further exemplary embodiments of the invention that the guide slot and the coupling slot are slots that are separated from each other and are arranged next to each other along the respective pivot axis, which, for example, at least partially overlap each other. Here, the coupling slot as well as the guide slot pass through the coupling element, whereby the driving element is positively guided across the coupling element by means of the guide slot.

In a further, especially advantageous embodiment of the invention, the covering elements are pivotable in opposite directions between the covering position and the convenience position, so that an especially space-efficient pivoting of the covering element can be presented. By pivotability in the same direction or by pivoting of the covering elements in the same direction should in particular be understood that, for example, the first covering element is pivotable or is pivoted in a first pivoting direction from the covering position into the convenience position, wherein the second covering element is pivotable or is pivoted in a second pivoting direction, that is opposite to the first pivoting direction, from the covering position into the convenience position.

Lastly, it has been shown to be especially advantageous if the pivot axes are spaced apart from each other in the vertical direction of the vehicle, whereby an especially simple and compact construction can be presented.

A second aspect of the invention relates to a covering assembly for a side sill of a passenger motor car, with a sill cover that comprises a first covering element that is arranged under a door opening in a longitudinal area of the side sill and a second covering element that is arranged under the door opening in the longitudinal area. The covering assembly also comprises a drive unit, by means of which the first covering element is pivotable around a first pivot axis and the second covering element is pivotable relative to the side sill between a covering position and a convenience position, around a second pivot axis that is spaced apart from the first pivot axis and runs parallel to the first pivot axis.

In order to be able to achieve an especially space-efficient and simple construction of the covering assembly, it is provided in the second aspect of the invention that the covering elements are pivotable in opposite directions between the covering position and the convenience position. Advantages and advantageous embodiments of the first aspect of the invention are to be seen as advantages and advantageous embodiments of the second aspect of the invention, and vice versa.

Further advantages and details of the invention arise from the following description as well as based on the drawings.

DETAILED DESCRIPTION OF THE DRAWINGS

In the figures, identical or functionally identical elements are provided with the same reference numerals.

Figure 1:
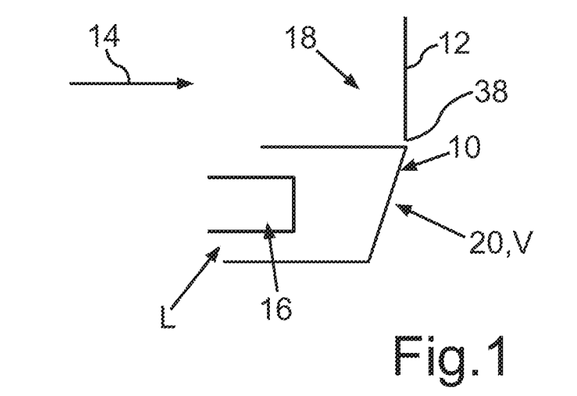
FIG. 1 shows a schematic sectional view though a covering assembly and a side door of a passenger motor car along a sectional plane running in the transverse direction of the vehicle and in the vertical direction of the vehicle.

FIG. 1 shows a sectional, schematic cut view through a covering assembly 10 and a door of a passenger motor car that is formed as a side door 12 along a sectional plane running in the transverse direction of the vehicle and in the vertical direction of the vehicle. Here, the transverse direction of the vehicle is illustrated in FIG. 1 by an arrow 14, which here points outwards in the transverse direction of the vehicle. A car body of the passenger motor car, that is preferably formed as a self-supporting car body, here has side sills, that are spaced apart from each other in the transverse direction of the vehicle. Of these side sills, a side sill labelled with 16 is recognizable in FIG. 1. The car body also has at least one door opening 18 on the side, which is delimited at least partially, in particular at least mostly or completely, by the side sill 20 at the bottom in the vertical direction of the vehicle. It is recognizable that at least one longitudinal area L of the side sill 16 is arranged or runs under the door opening 18 in the vertical direction of the vehicle and is thus at least partially, in particular at least mostly or completely, arranged at the same height as the door opening 18 in the longitudinal direction of the vehicle. At least one part of the longitudinal area L that runs in the longitudinal direction of the vehicle thus extends over at least one part of a stretch or length of the door opening 18 that runs in the longitudinal direction of the vehicle. In particular, the side sill 16 extends in the longitudinal direction of the vehicle, for example, between wheel arches that are arranged consecutively to each other or behind each other in the longitudinal direction of the vehicle. For example, the side sill 20 forms a so-called door entrance or is a component of a so-called door entrance, through which a person has to move, in order to get out of the interior of the passenger motor car that is delimited by the car body, into its surroundings, or to enter the interior from the surroundings.

Figure 2:
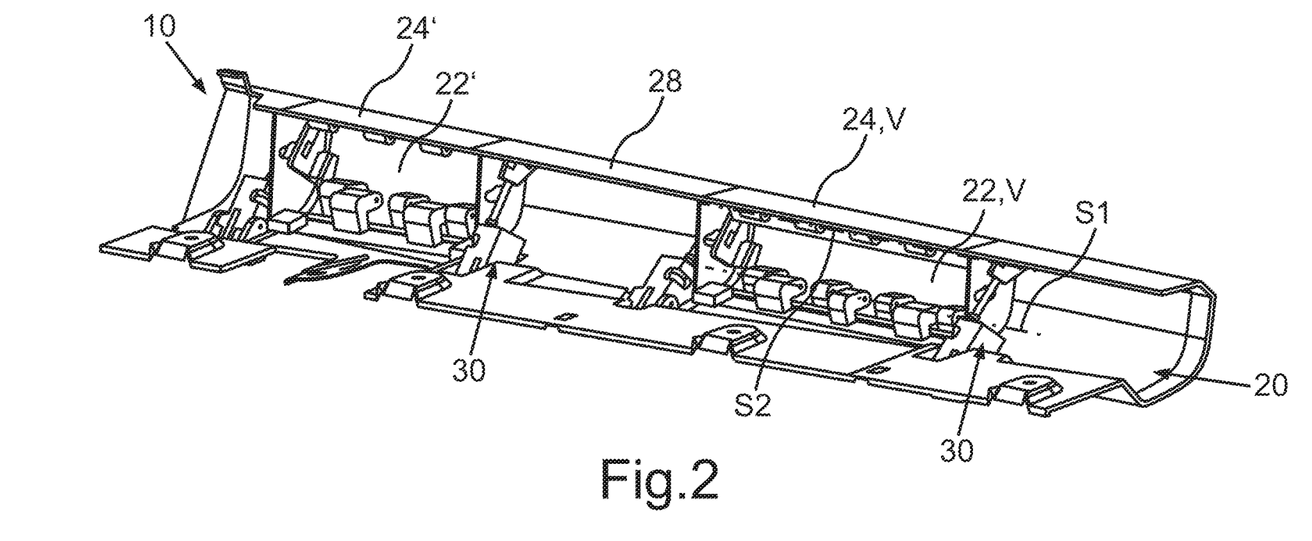
FIG. 2 shows a schematic and perspective rear view of the covering assembly according to a first exemplary embodiment, wherein covering elements of the covering assembly are in a covering position.

As is recognizable with an overall view of FIG. 2, the covering assembly 10 has a side sill 20, which comprises a first covering element 22 that is arranged under the door opening in the longitudinal area L of the side sill 16 and a second covering element 24 that is arranged under the door opening 18 in the longitudinal area L of the side sill 16. The door opening 18 that is partially recognizable in FIG. 1 is, for example, a front door opening, wherein the car body can also have a second door opening that is arranged behind the front door opening 18 in the longitudinal direction of the vehicle. The door opening 18 and the second door opening are, for example, arranged on the same side of the car body in the transverse direction of the vehicle. The sill cover 20 here comprises a third covering element 22' and a fourth covering element 24', which are arranged under the second door opening in a second longitudinal area of the side sill 16. The preceding and following statements on the covering element 22 can also be applied to the covering element 22' without further comment, and vice versa, wherein the preceding and following statements on the covering element 24 can also be applied to the covering element 24' without further comment and vice versa. It is preferably provided that the covering elements 22 and 24 have the same length running in the longitudinal direction of the vehicle. The covering elements 22 and 24 are also at least partially, in particular at least mostly or completely arranged at the same height in the longitudinal direction of the vehicle.

The covering assembly 10 furthermore comprises a drive unit that is shared between the covering elements 22 and 22, which is described in yet more detail in the following. By means of the drive unit, the first covering element 22 is pivotable relative to the side sill 16 as well as relative to a fifth covering element 28 of the sill cover 20, around a first pivot axis 51 that preferably runs at least essentially in the longitudinal direction of the vehicle. The covering element 28 is stationary relative to the side sill 16 and is thus immovable relative to the side sill 16. In other words, the covering element 28 is a sill-fixed covering element. By means of the drive unit, the second covering element 24 is pivotable relative to the covering element 28 and relative to the side sill 16, around a second pivot axis S2, wherein the second pivot axis S2 is spaced apart from the pivot axis 51 and runs parallel to the pivot axis 51. Preferably, the pivot axis S2 is arranged at least in the vertical direction of the vehicle from the pivot axis 51.

Figure 3:
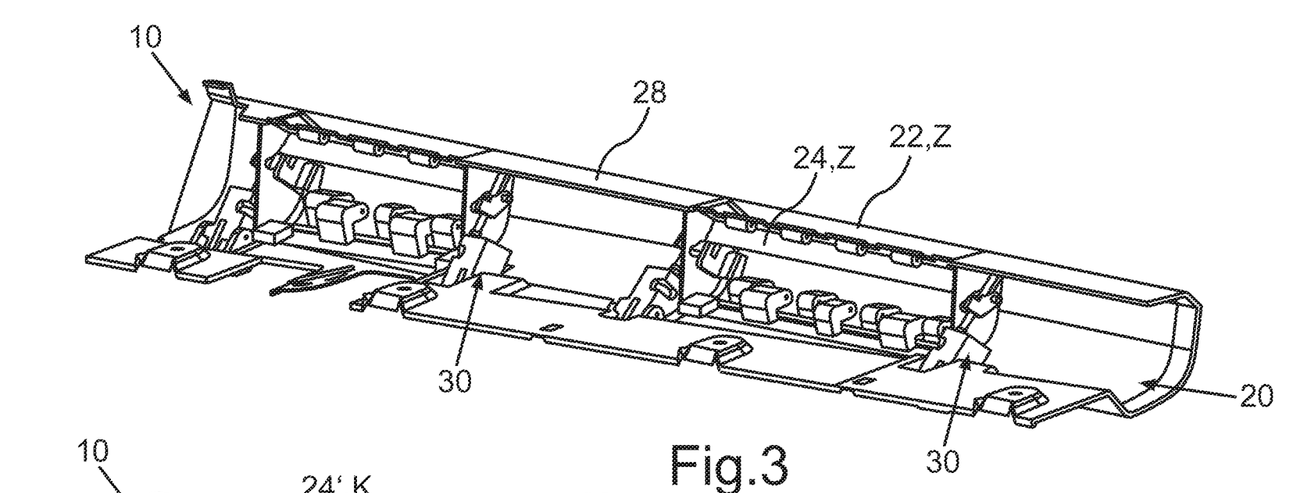
FIG. 3 shows a schematic and perspective rear view of the covering assembly, wherein the covering elements are in an intermediate position between the covering position and a convenience position.
Figure 4:
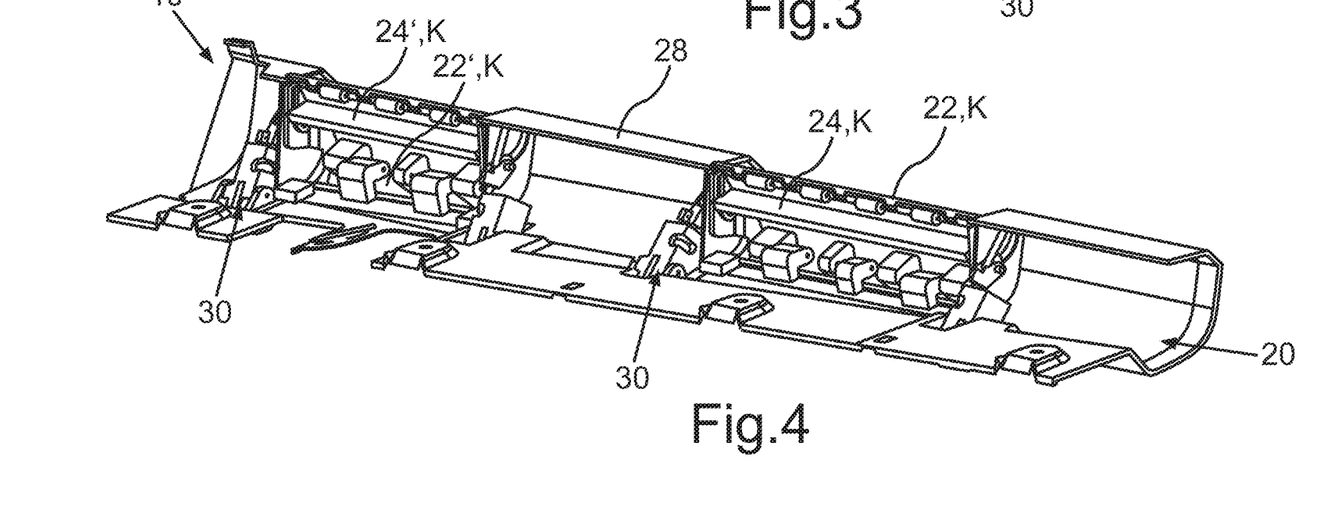
FIG. 4 shows a schematic and perspective rear view of the covering assembly, wherein the covering elements are in the convenience position.
Figure 5:
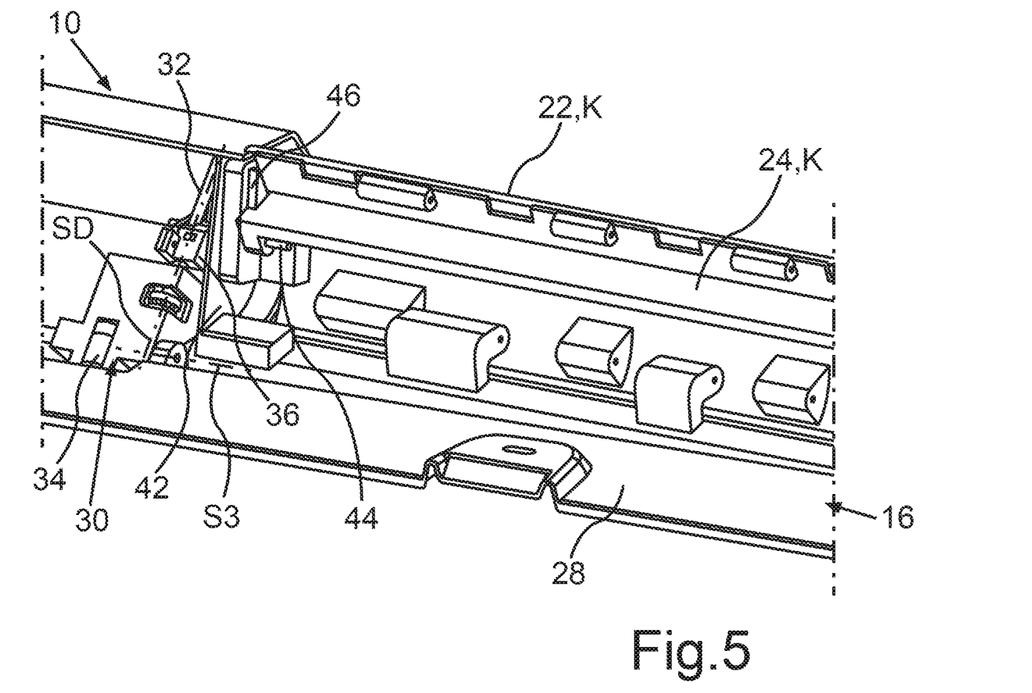
FIG. 5 shows a sectional, schematic and perspective rear view of the covering assembly, wherein the covering elements are in the convenience position.
Figure 6:
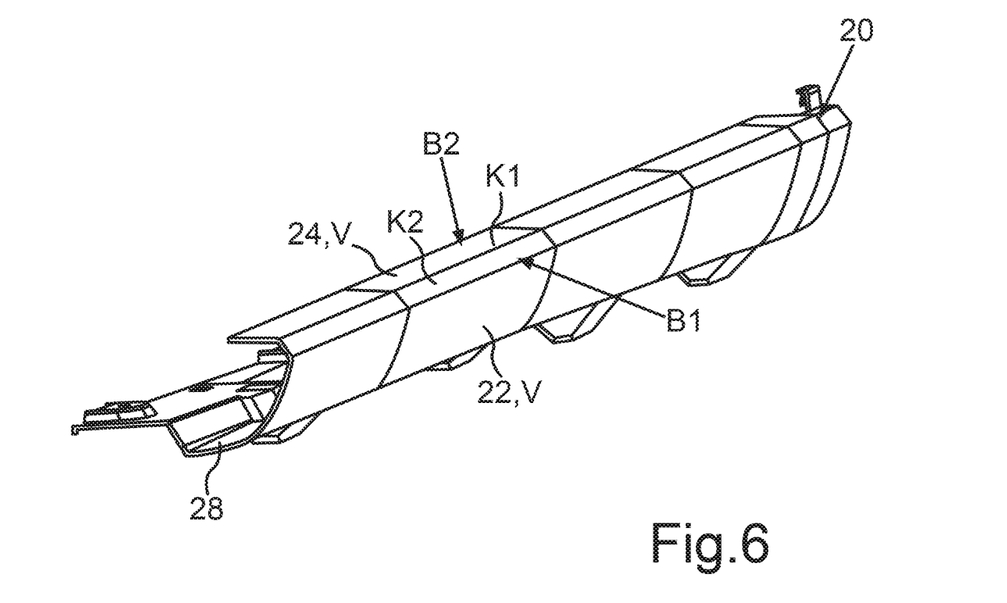
FIG. 6 shows a schematic and perspective front view of the covering assembly according to the first embodiment, wherein the covering elements are in the covering position.
Figure 7:
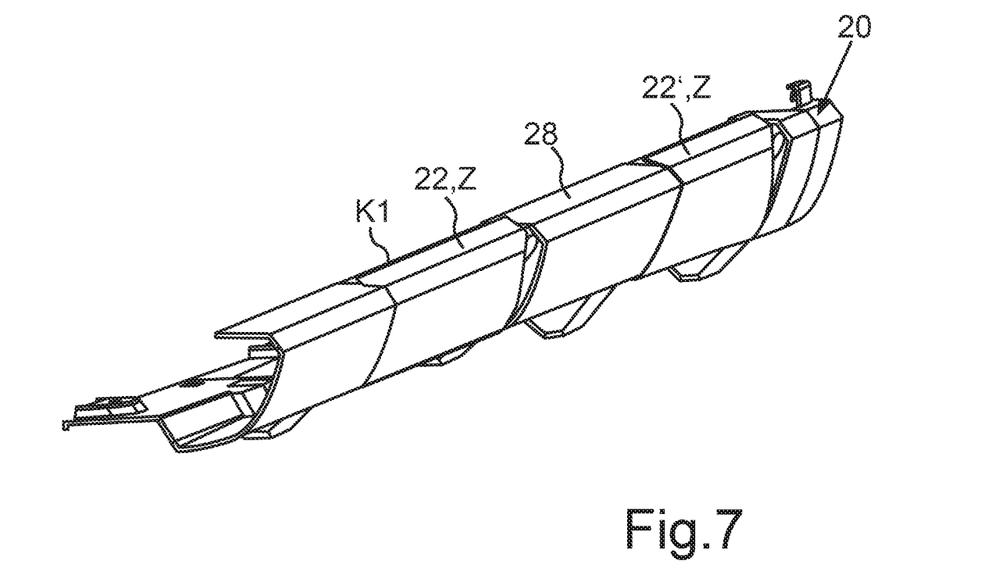
FIG. 7 shows a schematic and perspective front view of the covering assembly, wherein the covering elements are in the intermediate position.
Figure 8:
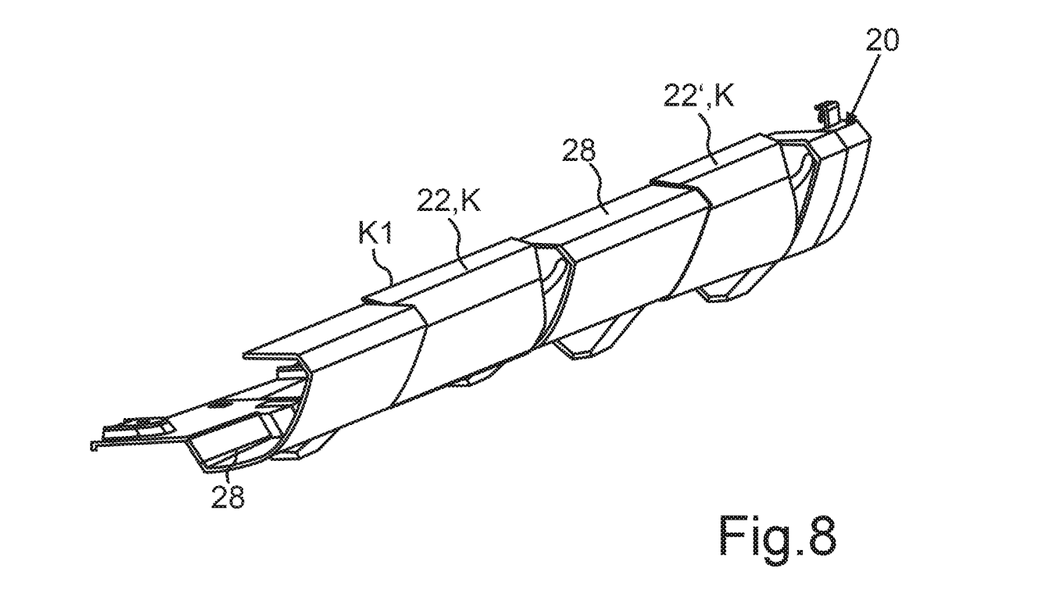
FIG. 8 shows a schematic and perspective front view of the covering assembly, wherein the covering elements are in the convenience position.

FIGS. 2 to 8 show a first embodiment, in which the pivot axis S2 is arranged higher up in the vertical direction of the vehicle than the pivot axis 51. It is furthermore conceivable that the pivot axes 51 and S2 are arranged offset from each other in the vertical direction of the vehicle, so that, for example, the pivot axis S2 is arranged further inwards or further outwards in the vertical direction of the vehicle than the pivot axis 51. Alternatively to this it is conceivable that the pivot axes 51 and S2 are arranged at the same height in the vertical direction of the vehicle. The pivot axes 51 and S2 run at least essentially in the longitudinal direction of the vehicle or parallel to the longitudinal direction of the vehicle. The covering elements 22 and 24 can be pivoted relative to the side sill 16 and relative to the sill-fixed covering element 28 between a covering position V that is shown in FIG. 2 and a convenience position K that is shown in FIG. 4 by means of the drive unit. On their respective level from the covering position V into the convenience position K or, vice versa, from the convenience position K into the covering position V, the covering elements 22 and 24 enter several intermediate positions arranged between the convenience position K and the covering position V. One of the intermediate positions is shown in FIG. 3 and is labelled with z.

In order to now be able to achieve an especially simple and space-effective construction of the covering assembly 10, the drive unit is formed as a spindle drive 30. The spindle drive 30 has—as is especially easily recognizable from FIG. 5—a spindle 32 that is shared with the covering elements 22 and 24, which is rotatable relative to the covering elements 22 and 24 and 28 and relative to the side sill 16, around a spindle axis of rotation SD. The respective pivot axis 51 or S2 runs perpendicular to a first plane, wherein the spindle axis of rotation SD runs perpendicular to a second plane. Here, the first plane runs at an angle or perpendicular to the second plane.

The spindle drive 30 also comprises a motor 34 that is shared between the covering elements 22 and 24 and is preferably formed as an electric motor, by means of which the spindle 32 is drivable and is thereby rotatable relative to the covering elements 22, 24 and 28 and relative to the side sill 16, around the spindle axis of rotation SD. Furthermore, the spindle drive 30 has a driving element 36 that is shared between the covering elements 22 and 24, which is screwed onto the spindle 32 and is thus arranged on the spindle 32. The driving element 36 is, for example, also secured against rotation occurring around the spindle axis of rotation SD and relative to the spindle 32, or rotations of the driving element 36 occurring around the spindle axis of rotation SD and relative to the spindle 32 are at least restricted, so that if the spindle 32 is rotated around the spindle axis of rotation SD by means of the motor 34, then the driving element 36 is slid along a direction of movement and along the spindle 32 and relative to the spindle 32. Here, the direction of movement coincides with the spindle axis of rotation SD. If, for example, the spindle 32 is rotated around the spindle axis of rotation SD in a first direction of rotation by means of the motor 34, then the driving element 36 is slid relative to the spindle 32 in a first sliding direction. If, for example, the spindle 32 is rotated around the spindle axis of rotation SD in a second direction of rotation that is opposite to the first direction of rotation by means of the motor 34, then the driving element 36 is thereby slid relative to the spindle 32 in a second sliding direction that is opposite to the first sliding direction. In this way, the driving element 36 can be slid back and forth along the spindle 32 and relative to the spindle 32. The respective sliding direction here runs parallel to the previously mentioned direction of movement and thus parallel to the spindle axis of rotation SD. The driving element 36 is, in particular flexibly, coupled with the covering elements 22 and 24, so that the covering elements 22 and 24 are pivotable between the covering position V and the convenience position K by means of sliding the driving element 36 along the spindle 32.

It is recognizable from FIG. 1 that the sill cover 20 extends so far outwards in the transverse direction of the vehicle in the covering position V that the sill cover 20—in the closed state of the side door 12, i.e., if the side door 12 is in its closed position—overhangs an associated door rim 18, which is, for example, formed by a framing or a covering, in particular an exterior covering, of the side door 12, or at least closes flush with the door rim 38. A stretch of the outer sill cover 20 of this sort in the covering position V has the advantage that damages from stone chippings or dirtying of the door rim 38 in general or of the whole lower area of the side door 12 can be avoided by means of the overlapping on the underside of the door rim 38 relative to the transverse direction of the vehicle or of the whole side door 12.

Such a stretch of the sill cover 20 can, however, bring up the issue of a complicated entry and exit into the passenger motor car and respectively out of this via the door opening 18, and indeed in particular for younger and/or older people or for people with limited mobility. This issue can be exacerbated if the side door 12 cannot, for example, be opened wide enough in cramped parking conditions. In particular in such situations, this can lead to an uncomfortable entry and exit, or to dirtying of clothes, in particular of trouser legs, associated with this.

The previously described issue can now, however, be avoided in an especially simple and space-efficient way. As is especially easily recognizable from FIGS. 6 to 8, if the covering elements 22 and 24 are pivoted from the covering position V into the convenience position K, then a rim K1 that is high up or the highest rim in the vertical direction of the vehicle in the covering position V, or an area B1 of the covering element 22 that is high up in the vertical direction of the vehicle in the covering position V, is pivoted inwards in the transverse direction of the vehicle, and a rim K2 that is outside or outermost in the transverse direction of the vehicle in the covering position V, or an area B2 of the covering element 24 that is outside or outermost in the transverse direction of the vehicle in the covering position V, is pivoted downwards in the vertical direction of the vehicle as well as inwards in the transverse direction of the vehicle. The covering elements 22 and 24 thereby free up a space or an area in the convenience position K, that is surrounded by the covering elements 22 and 24 in the covering position V. Consequently, a person can move at least one of their legs into the space or area that is freed up in the convenience position K and thus get out of the passenger motor car or get into the passenger motor car especially easily and comfortably. Furthermore, it is especially easily recognizable from FIG. 6 that the rims K1 and K2 border and/or fit closely to each other, in particular directly, in the covering position V. In other words, the rims k1 and K2 are facing each other, in particular directly, in the covering position V.

From an overall view of FIGS. 2 to 4 it can be especially easily recognized that the spindle 32 and the motor 34 are pivotable relative to the side sill 16 and relative to the sill-fixed covering element 28 with the covering elements 22 and 24, around an axis of rotation S3 that is also referred to as the third pivot axis. In the first embodiment, the covering elements 22 and 24 are, each considered individually, mounted on the covering element 28 and via this, on the side sill 16, to be pivotable relative to the covering element 28, around the respective pivot axes 51 and S2. The spindle 32 and the motor 34 are mounted on the covering element 28 and via this, on the side sill 16, to be pivotable or rotatable relative to the covering element 28, around the axis of rotation S3. Here, the axis of rotation S3 runs parallel to the pivot axes 51 and S2, wherein the axis of rotation S3 is spaced apart from the pivot axes 51 and S2, in particular in the vertical direction of the vehicle and/or in the transverse direction of the vehicle. In the first embodiment it is provided that the axis of rotation S3 is arranged further inwards in the transverse direction of the vehicle than the pivot axes 51 and S2.

Figure 9:
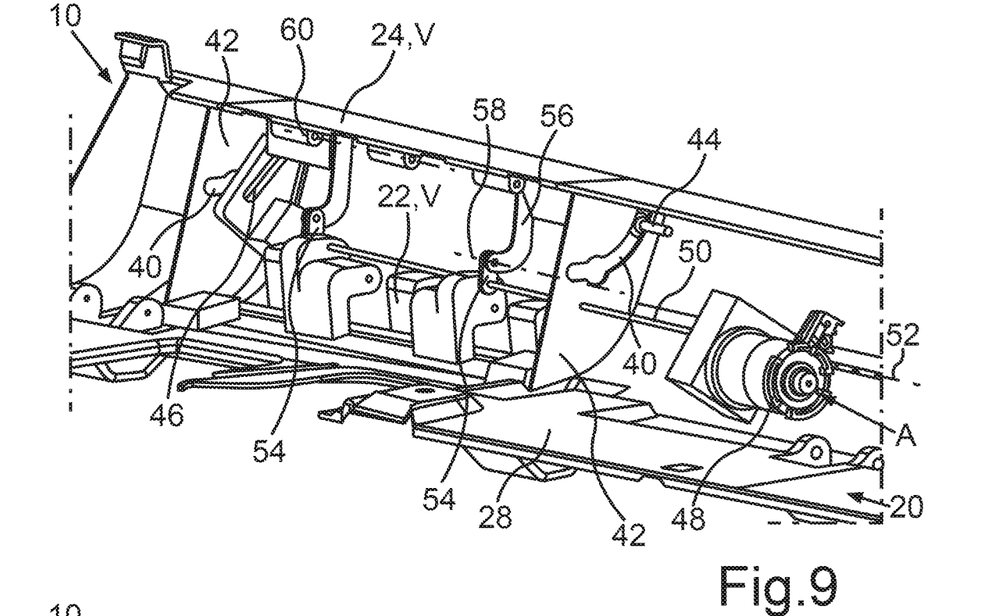
FIG. 9 shows a sectional, schematic and perspective rear view of the covering assembly according to a second embodiment, wherein the covering elements are in the covering position.
Figure 10:
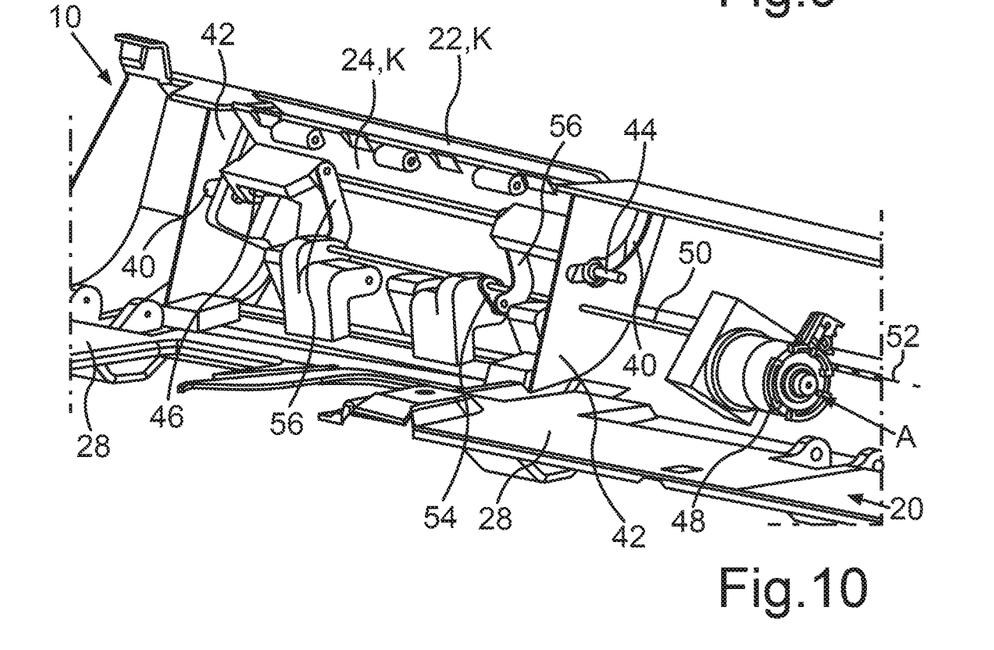
FIG. 10 shows a sectional, schematic and perspective rear view of the covering assembly according to the second embodiment, wherein the covering elements are in the intermediate position.

FIGS. 9 and 10 show a second embodiment of the covering assembly 10. The second embodiment differs from the first embodiment in particular in the drive unit, wherein the embodiments can otherwise correspond to each other. It is thus especially easily recognizable from FIGS. 9 and 10 that the covering assembly 10 herein has a curved or arch-shaped guide slot 40. The guide slot 40 is formed in a wall 42 of the sill-fixed covering element 28 and completely passes through the wall 42, so that the guide slot 40 is a through-opening or a through-slot. The wall 42 is a ridge of the covering element 28, which ridge in particular extends at least essentially planarly in the transverse direction of the vehicle and in the vertical direction of the vehicle. Here, it can be recognized from FIG. 5 that the driving element 36 is connected or coupled with a coupling element 44 that is also referred to as a coupling, so that the coupling element 44 is displaceable with the driving element 36 along and relative to the spindle 32. As is explained in still more detail in the following, the driving element 36 and, via this, the spindle 32 and the motor 34 are positively guided via the coupling element 44 during the sliding of the driving element 36 that occurs along the spindle 32 by means of the guide slot 40, whereby the pivoting of the spindle 32 and of the motor 34 around the axis of rotation S3 results from the sliding of the driving element 36 that occurs along the spindle 32. To this end, the coupling element 44 engages in the guide slot 40. In the first embodiment, the coupling element 44 engages in the corresponding guide slot 40 in such a way that the coupling element 44 passes through the guide slot 40.

The coupling element 44 is thereby, in particular flexibly, coupled to the covering element 24, whereby the covering element 24 is pivoted relative to the covering element 28 around its pivot axis S2 by means of sliding the driving element 36 and the coupling element 44. Furthermore, the covering assembly 10 has a coupling slot 46, which is, for example, formed as a second guide slot, which is formed in the first covering element 22. The coupling slot 46 is thereby formed in a wall of the covering element 22 in such a way that the coupling slot 46 passes through the wall and thus the covering element 22. In the exemplary embodiment shown in the FIGS., the coupling slot 46 is formed as a straight guide, which has at least one guide section that runs straight or in a straight line, in or along which the coupling element 44 is slidable relative to the covering element 22. Here, the coupling element 44 passes through the coupling slot 46, so that the coupling element 44 also engages in the coupling slot 46. The covering element 22 is hereby also coupled with the coupling element 44 and, via this, with the driving element 36, so that the covering element 22 is also pivoted relative to the covering element 28, around its pivot axis 51 by means of sliding the driving element 36 and thus the coupling element 44.

It is recognizable that the guide slot 40 and the coupling slot 46 are separate slots from each other, which are arranged along the respective pivot axis 51 or S2 consecutively to each other or behind each other. The coupling element 44 is coupled with the covering element 24 on a respective first side of the covering element 22 that faces away from the driving element 36 or the spindle 32, in particular of the wall in which the coupling slot 46 is formed, and of the ridge in which the guide slot 40 is formed. The spindle 32 and the driving element 36 are arranged on a respective second side of the covering element 22 that faces away from the respective first side, in particular the mentioned wall of the covering element 22, or of the ridge. The wall in which the coupling slot 46 is formed is also arranged between the covering element 24 and the ridge or between the covering element 24 and the driving element 36 or the spindle 32 along the respective pivot axis 51 or S2. An especially simple, robust and space-effective construction can thereby be achieved.

In particular because the coupling slot 46 is formed as a wire guide and, however, the spindle 32, the motor 34 and the covering elements 22 and 24 carry out rotational movements, i.e., pivoting movements, if the covering elements 22 and 24 are pivoted, the following sequence of movements can, for example, arise: the covering element 22 is, for example, pivoted in a first pivot direction, in order to move the covering element 22 from the convenience position K into the covering position V. In order to move or pivot the covering element 22 from the covering position V into the convenience position K, the covering element 22 is pivoted in a second pivot direction that is opposite to the first pivot direction. In order to, for example, pivot the covering element 24 from the convenience position K into the covering position V, the covering element 24 is pivoted in a third pivot direction. In order to move or pivot the covering element 24 from the covering position V into the convenience position K, the covering element 24 is pivoted in a fourth pivot direction that is opposite to the third pivot direction. Here, the first pivot direction and the third pivot direction are opposite directions, and the second pivot direction and the fourth pivot direction are opposite directions. If, starting from the covering position V, the spindle 32 is rotated in such a way that the driving element 36 slides in such a way that the covering elements 22 and 24 thus pivot from the covering position V into the convenience position K, then, starting from the covering position V, the covering element 22 is initially pivoted a small distance in the first pivot direction, and only after this does the covering element 22 pivot in the second pivot direction and thus into the convenience position K. Therefore, starting from its covering position V, the covering element 24 is initially pivoted a small distance in the third pivot direction, and only after this does the covering element 24 pivot in the fourth pivot direction and thus into the convenience position K. The opposite respectively applies when the covering elements 22 and 24 pivot out of the convenience position K into the covering position V. Therefore, the spindle 32 is rotated in such a way that the driving element 36 slides in such a way that the covering elements 22 and 24 thus pivot into the covering position V. However, starting from the convenience position K, the covering element 22 is initially pivoted a small distance in the second pivot direction, and only after this does the covering element 22 pivot in the first pivot direction and thus into the covering position V. Therefore, starting from the convenience position K, the covering element 22 is initially pivoted a small distance in the fourth pivot direction, and only after this does the covering element 24 pivot in the third pivot direction and thus into the covering position V. Thus, the covering position V and the convenience position K are both dead centers, in which the covering elements 22 and 24 come to rest. However, the respective covering element 22 or 24 is not pivoted out of the respective dead center directly in the respective pivot direction and thus in the direction of the respective other dead center during its adjustment or pivoting, rather, starting from the respective dead center, the respective covering element 22 or 24 is initially moved a small distance beyond the respective dead center and thus is moved away from the respective other dead center and is only then moved back to the respective dead center, moves into the respective dead center and moves beyond the respective dead center and into the respective other dead center. A respective position, in which the respective covering element 22 or 24 is, for example, moved beyond the respective dead center if the respective covering element 22 or 24 is moved out of the respective dead center into the respective other dead center, wherein the respective covering element 22 or 24 reverses, so to speak, into this position, and is then moved back in the direction of the respective dead center again, into the respective dead center, beyond the respective dead center and finally into the respective other dead center, is also referred to as an upper dead center or an upper dead center position.

Furthermore, a respective abutment is, for example, provided, with which the respective covering element 22 or 24 comes into an at least indirect, in particular direct, support attachment, during its respective pivoting into the covering position V or into the convenience position K. This then happens, for example, if the respective covering element 22 or 24 reaches its respective upper dead center or its respective dead center. The covering elements 22 and 24 can thereby be kept securely in the covering position V and in the convenience position K.

The drive unit is, for example, controlled by the electronic computing device of the passenger motor car, in order to correspondingly pivot the covering elements 22 and 24 by means of the drive unit. This pivoting of the covering elements 22 and 24 between the covering position V and the convenience position K is, for example, part of a comfort function, which can also comprise that a steering wheel that is arranged in the interior of the passenger motor car is moved, in particular at least in the vertical direction of the vehicle, in order to allow an especially simple and comfortable entrance and exit. For example, the comfort function comprises that if a person would like to enter the passenger motor car or exit the passenger motor car, then the steering wheel is moved upwards in the vertical direction of the vehicle and the covering elements 22 and 24 are pivoted out of the covering position V into the convenience position K. If the person has entered or exited, then the steering wheel is moved back downwards in the vertical direction of the vehicle, and the covering elements 22 and 24 are moved out of the convenience position K into the covering position V.

As previously mentioned, the second embodiment differs from the first embodiment, in particular in terms of its drive unit. In the second embodiment, the drive unit is not formed as a spindle drive, rather the drive unit, which is labelled with A in FIGS. 9 and 10, comprises a motor 48, in particular formed as an electric motor, and a drive shaft 50, which can be driven by the motor 48 that is, for example, formed as an electric motor and is thereby rotatable relative to the sill-fixed covering element 28 and thus relative to the side sill 16, around a drive axis 52. The drive shaft 50 is coupled, in particular in a manner in which it is fixed against rotation, with at least one first coupling 54, which is rotatable relative to the covering element 28, around the drive axis 52. The first coupling 54 is flexibly coupled with a second coupling 56 in such a way that the couplings 54 and 56 are pivotable relative to each other, around a coupling axis 58. The coupling axis 58 runs parallel to the drive axis 52 and is spaced apart from the drive axis 52. Furthermore, the drive axis 52 and/or coupling axis 58 run parallel to the pivot axes 51 and S2. The coupling axis 58 and/or the drive axis 52 are also spaced apart from the pivot axes 51 and S2. The second coupling 56 is, in turn, flexibly coupled with the covering element 24 in such a way that the second coupling 56 and the covering element 52 are pivotable relative to each other, around a second coupling axis 60. The coupling axis 60 runs parallel to the coupling axis 58 and/or parallel to the drive axis 52 and/or parallel to the pivot axes 51 and S2. The coupling axis 60 is also preferably spaced apart from the pivot axis 51 and/or from the pivot axis S2 and/or from the coupling axis 58 and/or from the drive axis 52. The coupling element 44 that engages in the guide slot 40 and in the coupling slot 46, in particular that passes through the guide slot 40 and/or the coupling slot 46, is held on the covering element 24 in the second embodiment and is thus pivotable with the covering element 24 relative to the covering element 28, in particular around the second pivot axis S2. The covering element 24 is thus, for example, positively guided by means of the guide slot 40 and by means of the coupling element 44, in particular at least during the pivoting of the covering element 24 or the covering elements 22 and 24. The coupling element 44 slides into and along the guide slot 40 and into and along the coupling slot 46 during the pivoting of the covering element 24. If the covering element 24 is driven and thus pivoted across the couplings 54 and 56 and across the drive shaft 50 by the motor 48, then the coupling element 44 thereby brings the covering element 22 with it, so that the covering element 22 is consequently pivoted with the covering element 24. The covering elements 22 and 24 are hereby pivoted, in particular at least partially jointly or simultaneously. As in the first embodiment, the covering elements 22 and 24 also pivot in opposite or different directions in the second embodiment, if they are pivoted out of the covering position V into the convenience position K or, vice versa, out of the convenience position K into the covering position V. An especially simple and space-efficient construction can thereby be achieved.

The invention claimed is:

1. A covering assembly for a side sill (16) of a passenger motor car, comprising:
 a sill cover (20) which comprises a first covering element (22) that is arrangeable under a door opening (18) in a longitudinal area (L) of the side sill (16) and a second covering element (24) that is arrangeable under the door opening (18) in the longitudinal area (L); and
 a drive unit (A), wherein via the drive unit (A) the first covering element (22) is pivotable around a first pivot axis (S1) and the second covering element (24) is pivotable relative to the side sill (16) between a covering position (V) and a convenience position (K) around a second pivot axis (S2) that is spaced apart from the first pivot axis (S1) and runs parallel to the first pivot axis (S1);
 wherein the drive unit (A) is a spindle drive (30) which comprises a motor (34) that is shared with the first and second covering elements (22, 24), a spindle (32) that is shared with the first and second covering elements (22, 24) and is rotatable by the motor (34), and a driving element (36) that is shared with the first and second covering elements (22, 24) and is screwed onto the spindle (32);
 wherein the driving element (36) is slidable along the spindle (32) via rotation of the spindle (32) relative to the driving element (36) such that the first and second covering elements (22, 24) are pivotable.

2. The covering assembly according to claim 1, wherein the spindle (32) is pivotable relative to the side sill (16) with the first and second covering elements (22, 24) around an axis of rotation (S3).

3. The covering assembly according to claim 2, wherein the axis of rotation (S3) is spaced apart from the first and second pivot axes (S1, S2).

4. The covering assembly according to claim 2, wherein the motor (34) is pivotable relative to the side sill (16) with the first and second covering elements (22, 24) and with the spindle (32) around the axis of rotation (S3).

5. The covering assembly according to claim 2, further comprising a guide slot (40), wherein via the guide slot (40) the driving element (36) is positively guided in a sliding of the driving element (36) along the spindle (32) such that the pivoting of the spindle (32) around the axis of rotation (S3) results from the sliding of the driving element (36) along the spindle (32).

6. The covering assembly according to claim 1, further comprising a coupling element (44) that is slidable with the driving element (36), wherein the coupling element (44) is coupled to one of the first and second covering elements (22, 24) and passes through a coupling slot (46) of the other one of the first and second covering element (22) such that the other one of the first and second covering element (22) is also coupled to the coupling element (44) and wherein the first and second covering elements (22, 24) are pivotable via a sliding of the driving element (36) along the spindle (32) via the coupling element (44).

7. The covering assembly according to claim 6, further comprising a guide slot (40), wherein via the guide slot (40) the driving element (36) is positively guided in a sliding of the driving element (36) along the spindle (32) such that the pivoting of the spindle (32) around the axis of rotation (S3) results from the sliding of the driving element (36) along the spindle (32), wherein the guide slot (40) and the coupling slot (46) are separated from each other and are disposed next to each other, wherein the coupling element (44) passes through the guide slot (40) such that the driving element (36) is positively guided across the coupling element (44) by the guide slot (40).

8. The covering assembly according to claim 1, wherein the first and second covering elements (22, 24) are pivotable in opposite directions between the covering position (V) and the convenience position (K).

9. The covering assembly according to claim 1, wherein the first and second pivot axes (S1, S2) are spaced apart from each other in a vertical direction.

* * * * *